United States Patent

[11] 3,583,486

| [72] | Inventor | Charles A. Stratton |
| | | Dewey, Okla. |
| [21] | Appl. No. | 858,855 |
| [22] | Filed | Sept. 17, 1969 |
| [45] | Patented | June 8, 1971 |
| [73] | Assignee | Phillips Petroleum Company |

[54] OIL RECOVERY PROCESS USING ETHOXYLATED PHENOL-FORMALDEHYDE PRODUCT
9 Claims, No Drawings

| [52] | U.S. Cl. | 166/274, 166/275, 252/8.55 |
| [51] | Int. Cl. | E21b 43/22 |
| [50] | Field of Search | 166/273−275; 252/8.55 (D) |

[56] References Cited
UNITED STATES PATENTS

| 3,085,063 | 4/1963 | Turbak | 166/275 |
| 3,376,924 | 4/1968 | Felsenthal et al. | 166/273X |
| 3,431,976 | 3/1969 | Harvey et al. | 166/274 |

OTHER REFERENCES

Johansen, R. T., et al. "Detergents for Petroleum Displacement in Soap & Chem. Specialties," Oct., 1955, pp. 41— 44, 79, 81. (Copy in 166-275)

*Primary Examiner*—Jan A. Calvert
*Attorney*—Young and Quigg

ABSTRACT: An improved method for waterflooding a subterranean oil-bearing reservoir wherein the injected flood water contains an additive having both surface active and viscosifying properties. Said additive is an ethoxylated condensation product of a phenol and formaldehyde.

OIL RECOVERY PROCESS USING ETHOXYLATED PHENOL-FORMALDEHYDE PRODUCT

This invention relates to a process for producing oil from an oil-bearing stratum by aqueous fluid drive.

The production of oil from subterranean oil-bearing strata by aqueous fluid drive such as waterflooding and steamflooding is an accepted technique in the petroleum industry. However, waterflooding as a secondary recovery method still leaves a substantial proportion of the oil in the formation and this remaining oil is, for the most part, unrecoverable by waterflooding in the normal conventional manner. Various additives have been proposed for the flood water in order to increase the efficiency of the waterflood process. For example, various water thickening additives have been developed and proposed for the purpose of adjusting the viscosity of the flood water in order to minimize the tendency of the water to finger ahead of the flood front. Another type of additive which has been proposed for incorporation in the flood water is surface active agents or "surfactants." These surface active agents are added to the flood water for the purpose of lowering the interfacial tension between the water and the reservoir oil, thus increasing the ultimate recovery of oil displaced by a waterflood. In many instances, both types of additives have each given improved results.

The use of water thickening agents and surface active agents in accordance with the prior art has required the addition of two different agents to the injected flood water. This creates the problem of incorporating the two different agents in the flood water in the proper amount. Another problem which is sometimes encountered is the compatibility of the two agents with each other and/or the formation being flooded. Still another problem or objection to the use of two different agents is the excessive cost. It would be highly desirable to have one efficient agent which possesses both surface active properties and water thickening or viscosifying properties.

The present invention solves the above problems by providing a single waterflooding additive which has both surface active properties and viscosifying properties. Thus, broadly speaking, the present invention comprises injecting into an oil-bearing stratum through a well therein an aqueous slug containing a small but effective amount of the surface active-viscosifier additive agent of the invention. Said additive agent of the invention is incorporated in the flood water in an amount sufficient to accomplish at least one of (a) a decrease in the interfacial tension of the stratum oil and said aqueous slug and (b) an increase in the viscosity of said aqueous slug. Said aqueous slug containing the additive of the invention is driven into the stratum away from the injection well so as to displace oil from the stratum. The slug is either then driven on through the stratum toward an offset production well or the pressure on the injection well is reduced so that the slug moves back to the injection well, moving the displaced oil into the injection well for production therefrom by conventional means such as pumping. When the process is applied to a single well, the injection, drive, and pressure release steps are repeated until the procedure is no longer economical. A preferred method in accordance with the invention comprises driving the injected aqueous slug containing the additive of the invention with a suitable driving fluid to one or more offset production wells which may lie in a ring or other suitable pattern around the injection well. The driving fluid can be water, steam, or a suitable gas such as air or combustion gas.

An object of the invention is to provide an improved aqueous fluid drive process for the production of oil from underground oil-bearing strata. Another object of the invention is to improve the economics of waterflooding operations in which water thickening agents and/or surfactant or surface active agents are incorporated in the injected water. Another object of the invention is to improve the utility and efficiency of an aqueous fluid drive process for recovering oil from an oil-bearing stratum by incorporating in the injection water a single additive agent having both surface active properties and viscosifying properties. Other aspects, objects, and advantages of the invention will be apparent to those skilled in the art in view of this disclosure.

Thus, according to the invention, there is provided a process for producing oil from an oil-bearing stratum penetrated by at least one injection well, which process comprises the steps of:

1. injecting into said stratum through said well an aqueous slug having dispersed therein a small but effective amount of a surface active-viscosifier additive agent characterized by the formula

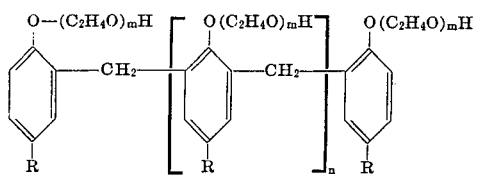

wherein each $R$ is selected from the group consisting of halogen, alkyl, cycloalkyl, or oxyalkyl groups containing from 6 to 20 carbon atoms, $m$ is an integer of from 1 to 30, and $n$ is an integer of from 0 to 50;

2. driving said slug of step (1) through said stratum away from said well so as to displace oil from said stratum; and
3. producing the displaced oil from a well penetrating said stratum.

The surface active-viscosifier additive agents of the invention can be prepared by methods known in the art. However, I have now discovered an improved, more efficient method for preparing said additives of the invention.

Thus, further according to the invention, there is provided a process for the preparation of a surface active-viscosifier additive agent, useful in waterflood operations, which process comprises: reacting nonaqueous formaldehyde with a para-substituted phenol wherein the substituent is selected from the group consisting of halogen, and alkyl, cycloalkyl, or oxyalkyl groups containing from 6 to 20 carbon atoms, in an inert nonaqueous solvent medium, in a reaction zone to which there has been added an active metal selected from the group consisting of sodium, potassium, lithium, rubidium, cesium, calcium, barium, and strontium, and mixtures thereof, to obtain a polycyclic hydrophobe characterized by the formula

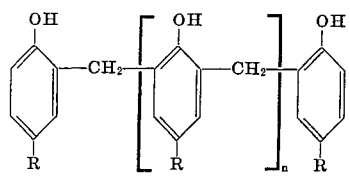

wherein each $R$ is a substituent as defined above and $n$ is an integer of from 0 to 50; removing water from the resulting reaction mixture; and then reacting said polycyclic hydrophobe with ethylene oxide, to obtain said additive agent characterized by the formula

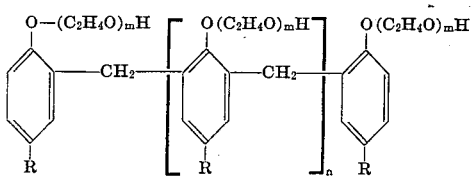

wherein $R$ and $n$ are as defined above, and $m$ is an integer of from 1 to 30.

Examples of p-substituted phenols which can be used in preparing the additive agents of the invention include p-hexylphenol, p-cyclohexylphenol, p-octylphenol, p-nonylphenol, p-dodecylphenol, p-pentadecylphenol, p-eicosylphenol, p-bromophenol, p-chlorophenol, p-iodophenol, p-fluorophenol, p-hexoxyphenol, p-cyclohexoxyphenol, p-octyloxyphenol, p-dodecyloxyphenol, p-pentadecyloxyphenol, p-eicosyloxyphenol, and the like.

The term "nonaqueous formaldehyde," as used herein and in the claims, unless otherwise specified, includes gaseous formaldehyde and paraformaldehyde.

Any suitable inert nonaqueous solvent medium which is inert with respect to, and is a solvent for, the reactants and the reaction product(s) can be employed in preparing the additive agents of the invention. One presently preferred group of solvents comprises the organic ethers such as furan, di-benzyl ether, di-phenyl ether, benzyl butyl ether, di-butyl ether, and the like. The choice of any specific solvent will depend upon the reaction conditions of temperature and pressure. Lower boiling solvents will require that the reactions be carried out under suitable pressure in an autoclave. It is preferred to employ solvents having a boiling point sufficiently high to permit the reactions to be carried out at substantially atmospheric pressure. The amount of solvent employed in the practice of the invention can be any suitable amount which is sufficient to keep the reaction mixture fluid. Usually, the amount of solvent employed will be in the order of equal weights of solvent and starting phenol reactant. However, lesser or greater amounts of solvent, e.g., up to a 2:1 weight ratio of solvent to starting phenol, can be used.

Any suitable alkali or alkaline earth metal capable of promoting the reactions involved in forming the additive agents of the invention can be used in the preparation of said additive agents. Active metals which are presently preferred for use in the practice of the invention include sodium, potassium, lithium, rubidium, cesium, calcium, barium, and strontium, and mixtures thereof.

In preparing the additive agent of the invention the reaction between the parasubstituted phenol and the formaldehyde can be carried out at a temperature within the range of from 100 to 170° C., preferably within the range of from 100 to 150° C. The reaction between the phenol-formaldehyde oligomer and the ethylene oxide can be carried out at a temperature within the range of from 130 to 250° C., preferably 140 to 220° C., more preferably 160 to 200° C.

In general, the phenol and formaldehyde are reacted in equimolar quantities. As indicated herein, it is preferred that the formaldehyde be added to the solution of the phenol incrementally for smoothness of reaction and more uniform growth of the polymer chain. However, it is within the scope of the invention to add all of the formaldehyde at one time. With incremental addition there will be an excess of phenol at the start of the reaction. Initially two molecules of phenol and one molecule of the formaldehyde react to form a dimer. As the polymer chain grows the ratio of phenolic reactant and formaldehyde approaches 1:1.

In general, the ratio of the phenol-formaldehyde reaction product or oligomer and the ethylene oxide reactants is determined by the value of $m$ in the above formula which characterizes the additive agent of the invention. Thus, the phenol-formaldehyde reaction product or oligomer can be reacted in any suitable or desirable molar ratio within the range of 1 to 30.

Any suitable pressure conditions can be employed in preparing the additive agent of the invention. It is preferred to carry out the reactions involved at substantially atmospheric pressure. However, superatmospheric pressures, sufficient to maintain the reactants and the reaction mixture in liquid phase conditions, can be employed, if necessary or desirable, depending upon the reactants.

In one presently preferred method for preparing the additive agent of the invention, the phenol starting reactant and the solvent are first placed in a suitable reaction vessel so as to dissolve the phenol in the solvent. If desired, heat and stirring can be employed to aid in effecting the solution. Generally speaking, the phenol and solvent are added in equimolar amounts. However, it is within the scope of the invention to use less or more solvent. After solution has been effected, the resulting solution is cooled preferably to about room temperature, and the active metal, e.g., sodium, is then added to the solution. Said active metal also goes into solution. If desired, warming can be utilized to aid in effecting solution of the metal. It is usually desirable to bubble a stream of nitrogen through the mixture or solution so as to remove the hydrogen. The formaldehyde is then added to the resulting reaction mixture, preferably incrementally. This addition can take place over a period of from a few minutes up to 5 or 6 hours, depending upon the volume of the reaction mixture and the particular reactants being used. Usually, it will be desirable to add the formaldehyde in increments over a period of 3 or 4 hours. It is preferred to maintain temperature control, as indicated above, during the addition of the formaldehyde. After adding the last increment of formaldehyde, the reaction mixture is then heated to a temperature within the range of 100 to about 200° C. and a stream of nitrogen gas or other inert gas is bubbled therethrough so as to remove water from the reaction mixture. It is desirable to remove any water present in the reaction mixture so as to shift the equilibrium in the reaction toward the formation of the condensation product, and to prevent hydrolysis of the ethoxide to the glycol in the subsequent ethoxylation reaction.

The resulting reaction mixture is then cooled, if desirable or necessary, to a temperature within the ranges stated above for carrying out the ethoxylation reaction, and ethylene oxide gas bubbled thereinto at a rate sufficiently slow to prevent the loss of ethylene oxide. If desired, samples of the reaction mixture can be taken during the ethylene oxide addition for testing purposes so as to monitor the course of the reaction. After the desired amount of ethylene oxide has been added, the solvent can be removed by vacuum distillation so as to recover the additive agent of the invention from the reaction mixture.

The above method of preparing the additive agents of the invention has a number of advantages over the methods known in the prior art for preparing materials of this type. For example, both of the principal reactions, i.e., the reaction between the phenol and the formaldehyde and the ethoxylation reaction of the phenol-formaldehyde condensation products, are carried out in the same solvent medium. Another advantage is that the same active metal can be used to promote both of said reactions. Still another advantage is that paraformaldehyde, a more convenient form of formaldehyde than either gaseous formaldehyde or aqueous formaldehyde can be used for the phenol-formaldehyde condensation reaction.

In the practice of the invention, a small but effective amount of the surface active-viscosifier additive agent of the invention is dispersed in water or brine or other suitable aqueous medium. By dispersing it is meant that the additive is soluble, colloidally soluble, or otherwise dispersed in the aqueous medium. The amount of said agent dispersed in said aqueous medium will be an amount sufficient to accomplish at least one of (a) a decrease in the interfacial tension between the stratum oil and the aqueous injection medium and (b) an increase in the viscosity of the aqueous injection medium. Usually, the amount of said agent dispersed in the aqueous medium will be an amount within the range of from 0.01 to 5, preferably 0.01 to 2, more preferably 0.05 to 1.5, weight percent of the aqueous medium. Said aqueous medium containing the additive agent of the invention dispersed therein is then injected through an injection well in an amount sufficient to permeate a substantial annulus of the stratum surrounding the injection well, such as at least 2 feet and up to 8 or 10 feet or more in width or radius. Usually, the amount of the aqueous injection medium injected into the formation will be an amount within the range of from 0.01 to 2, preferably 0.1 to 0.5, pore volumes. As indicated above, the displaced oil can be produced from the injection well, if desired. However, it is preferred to drive the aqueous injection fluid from the injection well to a spaced apart production well and produce the displaced oil from said production well. For economy reasons, it is preferred to inject a slug of the aqueous injection medium and then follow said slug with a suitable driving fluid as mentioned above.

The following examples will serve to further illustrate the invention.

Example I

One mol (206 grams) of a para-octylphenol (1,1,3,3-tetramethylbutylphenol) and approximately 1 mol (206 grams) of dibenzyl ether were placed in a flask equipped with a stirrer, a thermocouple, and a bubbler inlet, and heated to about 130° C. to effect solution of said phenol in said ether. The resulting solution was cooled to about room temperature and 0.083 mol of sodium metal (1.9 grams) was added. The resulting mixture was warmed and a stream of nitrogen bubbled therethrough to aid in effecting solution of the sodium metal and to remove the evolved hydrogen.

Increments of paraformaldehyde were then added as follows: 10.17 grams; 10.01 grams; 4.98 grams; and 2.63 grams. Said increments of paraformaldehyde were added over a 4-hour period while the mixture was maintained at a temperature within the range of from 130 to 165° C. The total formaldehyde added was 0.924 mol per mol of the starting octylphenol. After adding the last increment of formaldehyde, the mixture was heated to about 200° C. and a stream of nitrogen bubbled therethrough to remove water. The resulting reaction mixture containing the phenol-formaldehyde oligomer was yellow, slightly viscous, and had a general appearance similar to buttermilk. Said reaction mixture was cooled to 183° C. and ethylene oxide gas bubbled thereinto at a rate of about 1 gram per minute. During the addition of the ethylene oxide the temperature of the reaction mixture varied between 175 and 190° C. A total of 455 grams of ethylene oxide was added (10.04 mols). It was observed that after the initial addition of about 15 grams of ethylene oxide, the mixture cleared to a homogeneous solution. During the addition of the ethylene oxide, 10 milliliter samples of the reaction mixture were taken for subsequent testing for oil recovery activity. The solvent was removed from each of these samples by vacuum distillation, leaving a "tacky" oil. These samples were taken at the following intervals.

1. After 400 g. ethylene oxide has been added.
2. After 420 g. ethylene oxide had been added.
3. After 440 g. ethylene oxide had been added.
4. After 455 g. ethylene oxide had been added.

Example II

The procedure of Example I was repeated using para-nonylphenol as the starting phenol. Sufficient paraformaldehyde was added to the reaction mixture to bring the ratio to 1.1 mol of formaldehyde per mol of phenol. In the ethoxylation step, 480 grams of ethylene oxide (10.9 mols) were added to the reaction mixture containing the phenol-formaldehyde oligomer.

A 1 percent by weight solution of the final reaction product (solvent-free) in simulated Burbank injection brine (described hereinafter) had a viscosity of 2.33 centipoises at 120° F. The refractive index of the solvent-free reaction product was 1.4881 at 152.6° F. When $n$ in the above formula characterizing said product is 10, the estimated average molecular weight is in the order of 6500—7000. When $n$ is 20, the estimated average molecular weight is 13,000 to 14,000.

A carbon, hydrogen, and oxygen determination made on the solvent-free reaction product gave the following results, in weight per cent: carbon 63.2; hydrogen 9.5; and oxygen 26.8. From these values the average value of $m$ was calculated to be 11.44.

Example III

Samples 1 to 4 of Example I were tested for oil recovery activity employing the technique described in U.S. Pat. No. 3,362,474, issued Jan. 9, 1968, to Heino Purre. The microcells employed in these tests were made from two 3 inch × 1 inch standard slides with a space of 15 mils between said slides. The spacing was established by a flat polyethylene bar 15 mils thick and one-sixteenth inch wide. The slides were grooved together at the edges with ethoxy resin. The 15-mil space was filled with oil-saturated Nacatoch sand and the fluids were injected at one end of the cell through a hypodermic needle and were produced at the other end of the cell through a hypodermic needle. In order to provide uniform flow over the cross section of the microcells, distribution bars of about 10 mils thickness were positioned at both ends of the sand. The pore volume of the cells was approximately 0.5 milliliter. Test solutions containing 1 percent by weight of sample 1—4 of Example I were prepared using simulated Burbank injection brine. This simulated brine contained 40.3 grams NaC1, 10.6 grams $CaCl_2$, and 4.8 grams $MgCl_2.6H_2O$ per liter. The results of the microcell tests were as follows.

| Sample | Production | Sweep Efficiency |
| --- | --- | --- |
| 1 | Good | Not Clean |
| 2 | Good | Fair |
| 3 | Excellent | Very Good |
| 4 | Good | Fair |

Example IV

Samples 3 and 4 of Example I and a sample of the final product of Example II were compared with a well known nonylphenoxypolyoxyethylene ethanol surfactant used in secondary recovery (Igepal 630). Microslides were prepared as above and 1 percent by weight solutions were injected in all cases.

| Additive | Oil Recovered % | Sweep Efficiency |
| --- | --- | --- |
| Igepal Co 630 | 30 | Poor |
| Example I, Sample 4 | 75 | Fair |
| Example I, Sample 3 | 98 | Excellent |
| Example II, Sample 3 | 100 | Sand Clean |

The above examples illustrate the outstanding oil displacing properties and viscosifying properties of the additive agents of the invention.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for producing oil from an oil-bearing stratum penetrated by at least one injection well, which process comprises the steps of:

1. injecting into said stratum through said well an aqueous slug having dispersed therein a small but effective amount of a surface active-viscosifier additive agent characterized by the formula

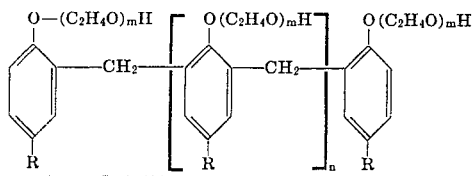

wherein each $R$ is selected from the group consisting of halogen, alkyl, cycloalkyl, or oxyalkyl groups containing from 6 to 20 carbon atoms, $m$ is an integer of from 1 to 30, and $n$ is an integer of from 0 to 50;

2. A process according to claim 1 wherein the amount of said additive contained in said slug is an amount sufficient to accomplish at least one of (a) a decrease in the interfacial tension of the stratum oil and said aqueous slug and (b) an increase in the viscosity of said aqueous slug.

3. producing the displaced oil from a well penetrating said stratum.

2. driving said slug of step (1) through said stratum away from said well so as to displace oil from said stratum; and 3. A process according to claim 2 wherein in step (2) the slug of step (1) is driven through said stratum with a fluid driving medium injected subsequent to said slug.

4. A process according to claim 3 wherein said fluid driving medium is water.

5. A process according to claim 2 wherein: said stratum is also penetrated by at least one production well; the slug in step (2) is driven through said stratum toward said production well so as to displace oil and move same into said production well; and said displaced oil of step (3) is produced from said production well.

6. A process according to claim 5 wherein in step (2) the slug of step (1) is driven through said stratum toward said production well with a fluid driving medium injected subsequent to said slug.

7. A process according to claim 6 wherein said fluid driving medium is water.

8. A process according to claim 1 wherein: said additive is present in said aqueous slug in a concentration within the range of from 0.01 to 5 weight percent; and said slug is introduced into said stratum in an amount within the range of from 0.01 to 2 pore volume.

9. A process according to claim 8 wherein: the value of $m$ in said formula is from 5 to 15; and the value of $n$ in said formula is from 10 to 20.

UNITED STATES PATENT OFFICE

CERTIFICATE OF CORRECTION

Patent No. 3,583,486                            Dated: June 8, 1971

It is certified that error appears in the above-identified patent and that said Letters Patent are hereby corrected as shown below:

Column 7, after line 4, insert

—2. driving said slug of step (1) through said stratum away from said well so as to displace oil from said stratum; and 3. producing the displaced oil from a well penetrating said stratum.—

Column 7, lines 10-13, delete

"3. producing the displaced oil from a well penetrating said stratum.

2. driving said slug of step (1) through said stratum away from said well so as to displace oil from said stratum; and"

Signed and sealed this 11th day of January 1972.

(SEAL)
Attest:

EDWARD M. FLETCHER, JR.
Attesting Officer

ROBERT GOTTSCHALK
Acting Commissioner of Patents